Patented Apr. 1, 1952

2,591,384

UNITED STATES PATENT OFFICE 2,591,384

PRODUCTION OF TRI- AND TETRA-ISOBUTYLENE

Donald R. Stevens, Wilkinsburg, and Robert S. Bowman, Pittsburgh, Pa., assignors to Gulf Research & Development Company, Pittsburgh, Pa., a corporation of Delaware No Drawing. Application December 4, 1947, Serial No. 789,745

11 Claims. (Cl. 260—683.15)

This invention relates to the production of tri- and tetra-isobutylene, and in particular concerns a process whereby there is produced a mixture of tri- and tetra-isobutlylene which may be employed directly in the manufacture of motor fuels or which may be separated into its two components for uses elsewhere in the arts.

It is well known that under the influence of various catalysts isobutylene undergoes polymerization to form products ranging in molecular weight from that of the dimer to values as high as 50,000 or more. These products vary in physical form from light mobile liquids to resinous or rubber-like solids depending upon the particular catalyst employed and the temperature at which the polymerization has been carried out. All of such products have utility in the arts, but those of lower molecular weight, particularly the trimer and the tetramer, are of particular value in the manufacture of motor fuels of the so-called "safety" type since they combine high octane value with relatively high flash point. These products are also useful in the manufacture of plasticizers, special solvents, hydraulic oils, detergents, etc. Many attempts have been made to control the polymerization of isobutylene so as to produce a polymeric product containing a high proportion of the trimer and/or tetramer, and while such attempts have been successful to a certain extent, the yield of desired product attained has heretofore been far below the theoretical maximum, primarily by reason of the formation of higher polymers.

It is accordingly an object of the present invention to provide a method for the production of tri- and tetra-isobutylene in high yield.

Another object is to provide a method for the production of a mixture of tri- and tetra-isobutylene suitable for use directly in the manufacture of motor fuels.

A further object is to provide a method for the production of tri- and tetra-isobutylene with minimum formation of higher polymers.

Other objects will be apparent from the following detailed description of the invention, and various advantages not specifically referred to herein will occur to those skilled in the art upon employment of the invention in practice.

We have found that the above and related objects may be realized in a process wherein there is combined the addition of isobutlylene to di-isobutylene to form tri-isobutylene and the dimerization of di-isobutylene to form tetra-isobutylene. More specifically, we have found that under the catalytic influence of a boron trifluoride-organic ether complex, isobutylene and di-isobutylene undergo an addition reaction to form tri-isobutylene. Simultaneously, the di-isobutylene polymerizes to form tetra-isobutylene. The overall result is the formation of a product consisting almost entirely of tri- and tetra-isobutylene with only a small amount of higher ploymers being present. Such product may be employed directly, either as such or in hydrogenated form, in the manufacture of "safety" motor fuels and other products, or the two main components may be separated for use individually. As will be more fully explained hereinafter, the ratio of tri-isobutylene to tetra-isobutylene in the mixed product may be varied between relatively wide limits, thereby permitting the production of mixtures of varying properties and suited for different specific uses.

The process of the invention is conveniently carried out by passing isobutylene into a liquid body comprising the di-isobutylene and the boron trifluoride-ether complex maintained at the desired reaction temperature. The reaction takes place readily with the evolution of heat, and consequently it is usually advantageous to carry out the reaction in the presence of a reaction solvent or diluent to assist in the dissipation of heat and control of the reaction temperature. The use of a solvent or diluent in this manner will also promote intimate contact between the catalyst and the reactants. The solvent or diluent employed must be inert as far as the reaction is concerned, i. e., it must not react with any of the reaction components at the temperatures involved. In general, suitable inert reaction solvents are non-polar organic liquids such as paraffin hydrocarbons, e. g., pentane, hexane, octane, etc., aromatic hydrocarbons, e. g., benzene, toluene, ethylbenzene, etc, and halogenated paraffin and aromatic hydrocarbons, e. g., methylene chloride, ethylene dibromide, chlorobenzene, etc. The use of such inert reaction solvents or diluents is not essential to successful practice of the invention, however, since satisfactory control of the reaction temperature and removal of heat may be effected in other ways, e. g., by employing a reaction vessel fitted with cooling coils, or by circulating the reaction mixture through a suitable heat exchanger. In cases where the boron trifluoride-ether complex is a solid, e. g., the complex of boron trifluoride and di-isopropyl ether, the use of an inert solvent is indicated in order to secure intimate contact between the reactants and the catalyst.

Any of the boron trifluoride-ether complexes may be employed as the catalyst in accordance with the invention, although the diethyl ether complex is usually preferred by reason of its low cost and commercial availability. If desired, however, the complexes of boron trifluoride with other dialkyl ethers, such as dimethyl ether, di-isopropyl ether, di-n-butyl ether, di-isoamyl ether, di-dodecyl ether, di-octadecyl ether, ethyl isopropyl ether, methyl amyl ether, n-propyl octyl ether, etc., as well as those with cycloalkyl ethers, such as di-cyclohexyl ether, ethyl cycloheptyl ether, etc., cyclic ethers such as dioxane, tetrahydrofurane, pentamethylene oxide, etc., alkyl-aryl ethers such as methyl phenyl ether, hydroquinone diethyl ether, etc., and aryl-substituted alkyl ethers such as dibenzyl ether, benzyl phenylethyl ether, etc., may be employed. Any of such ether complexes may be prepared simply by passing gaseous boron trifluoride into the ether at ordinary temperatures until the desired increase in weight is obtained. Usually the complex will contain the boron trifluoride and ether in equimolecular proportions, although complexes of other proportions may be employed. The amount of catalyst employed may be varied between wide limits, but in the interests of economy is usually kept as low as is consistent with optimum yield of the desired product. Ordinarily, between about 0.01 and about 0.2 moles of the catalyst are employed per mole of the di-isobutylene.

The rate at which the isobutylene is introduced into the mixture of di-isobutylene and catalyst is of influence on the proportions in which the tri- and tetra-isobutylene occur in the product. In general it has been found that at any given reaction temperature and for any given amount of isobutylene absorbed, the formation of tetra-isobutylene is favored when the isobutylene is absorbed in the di-isobutylene-catalyst mixture at a relatively rapid rate, whereas the formation of tri-isobutylene can be favored by decreasing such rate. Accordingly, the nature of the product may be readily controlled by controlling the rate of addition of the isobutylene. This feature of the invention is of particular advantage when the product is to be used in motor fuel manufacture since it enables the direct production of tri- and tetra-isobutylene blends having preselected fuel properties. Ordinarily, the more useful products are obtained when employing a molar ratio of isobutylene to di-isobutylene between about 6 : 1 and about 1 : 1, and when introducing the isobutylene into the mixture of di-isobutylene and catalyst at such a rate that the time of contact is between about 0.5 and about 5 hours.

The temperature at which the reaction is carried out may be varied over a considerable range although optimum yields of the desired products are usually obtained when employing a reaction temperature between about 0° C. and about 110° C. At temperatures below about 0° C., the reaction takes place relatively slowly and with the formation of appreciable amounts of isobutylene polymers of relatively high molecular weight, whereas at temperatures above about 110° C. appreciable amounts of low molecular weight polymers higher than the tetramer are formed. A preferred range of operating temperatures is between 15° C. and about 70° C.

Upon completion of the reaction, the desired product may be separated from the catalyst and any unconverted reactants and/or polymeric by-products by any convenient means, e. g., by fractional distillation, solvent extraction, azeotropic distillation, etc. When a product of high purity is desired, it is preferable to remove the catalyst by washing the reaction product with a dilute aqueous alkali and water, and thereafter fractionally distilling the washed product to isolate the tri- and tetra-isobutylene. These products may be collected as separate fractions or as a combined fraction distilling between about 170° C. and about 245° C. under atmospheric pressure.

The following examples will illustrate several ways in which the principle of the invention has been applied, but are not to be construed as limiting the same.

Example I

Approximately 56 parts by weight of di-isobutylene (0.5 mole) and 6 parts by weight (0.04 mole) of the equimolecular complex of boron trifluoride and diethyl ether were dissolved in 56.5 parts by weight of chlorobenzene and placed in a reaction vessel mounted in a water bath and fitted with a motor-driven high-speed stirrer. Approximately 142 parts by weight of iso-butylene (2.54 moles) were then introduced with stirring into the solution of di-isobutylene and catalyst over a period of about 1 hour while maintaining a temperature of about 25° C. The contents of the vessel were then washed once with about 100 parts of dilute aqueous sodium hydroxide, and several times with water. After drying over sodium sulfate, the washed product, in the amount of 245 parts by weight, was fractionally distilled whereby there was obtained in addition to the chlorobenzene solvent 169.8 parts by weight of a mixture of tri- and tetra-isobutylene. The ratio of tri-isobutylene to tetra-isobutylene in the mixture was 1.52:1.

Example II

Approximately 56 parts by weight of di-isobutylene (0.5 mole) and 6 parts by weight (0.04 mole) of the equimolecular complex of boron trifluoride and diethyl ether were dissolved in 56.5 parts by weight of chlorobenzene. Approximately 153 parts by weight of isobutylene (2.73 moles) were then added over a period of about 1.8 hours at a temperature of about 25° C. as described above in Example I. The product so obtained was then washed with dilute aqueous sodium hydroxide and water, and after drying over sodium sulfate, was fractionally distilled. There was obtained 9.0 parts by weight of unreacted di-isobutylene, 143.0 parts by weight of tri-isobutylene, and 39.1 parts by weight of tetra-isobutylene. These quantities correspond to a trimer-to-tetramer ratio of about 3.66:1.

While the preceding examples and detailed description refer to the process of the invention as being carried out in a batch-wise manner under atmospheric pressure, it will be apparent to those skilled in the art that the process is equally adaptable to continuous or semi-continuous operation under super-atmospheric or reduced pressures through the use of known engineering techniques.

Other modes of applying the principle of our invention may be employed instead of those explained, change being made as regards the process herein disclosed provided the step or steps stated by any of the following claims, or the equivalent of any such stated step or steps, be employed.

We, therefore, particularly point out and distinctly claim as our invention:

1. The process for preparing tri-isobutylene and tetra-isobutylene which comprises reacting isobutylene with di-isobutylene at a temperature between about 0° C. and about 110° C. in the presence of a catalytic amount of boron trifluoride-ether complex.

2. The process for preparing tri-isobutylene and tetra-isobutylene which comprises reacting isobutylene with di-isobutylene at a temperature between about 15° C. and about 70° C. in the presence of a catalytic amount of a boron trifluoride-ether complex.

3. The process for preparing tri-isobutylene and tetra-isobutylene which comprises reacting isobutylene with di-isobutylene at a temperature between about 0° C. and about 110° C. in the presence of a catalytic amount of a boron trifluoride-ether complex and an inert reaction solvent.

4. The process for preparing tri-isobutylene and tetra-isobutylene which comprises reacting isobutylene with di-isobutylene at a temperature between about 0° C. and about 110° C. in the presence of a catalytic amount of a complex of boron trifluoride and a dialkyl ether.

5. The process for preparing tri-isobutylene and tetra-isobutylene which comprises reacting isobutylene with di-isobutylene at a temperature between about 0° C. and about 110° C. in the presence of a catalytic amount of a complex of boron trifluoride and a dialkyl ether and an inert reaction solvent.

6. The process for preparing tri-isobutylene and tetra-isobutylene which comprises reacting isobutylene with di-isobutylene at a temperature between about 0° C. and about 110° C. in the presence of a catalytic amount of a boron trifluoride-diethyl ether complex.

7. The process for preparing tri-isobutylene and tetra-isobutylene which comprises reacting isobutylene with di-isobutylene at a temperature between about 0° C. and about 110° C. in the presence of a catalytic amount of a boron trifluoride-diethyl ether complex and an inert reaction solvent.

8. The process which comprises introducing isobutylene into a liquid body comprising di-isobutylene and a catalytic amount of a boron trifluoride-ether complex while maintaining the temperature of said liquid body between about 0° C. and about 110° C. and thereafter isolating tri-isobutylene and tetra-isobutylene from the resultant product.

9. The process which comprises introducing isobutylene into a liquid body comprising di-isobutylene and a catalytic amount of a boron trifluoride-diethyl ether complex solvent while maintaining the temperature of said liquid body between about 0° C. and about 110° C., and thereafter isolating tri-isobutylene and tetra-isobutylene from the resultant product.

10. The process which comprises introducing isobutylene into a liquid body comprising di-isobutylene and a catalytic amount of an equimolecular complex of boron trifluoride and diethyl ether dissolved in an inert reaction solvent while maintaining the temperature of said liquid body between about 15° C. and about 70° C., and thereafter isolating tri-isobutylene and tetra-isobutylene from the resultant product.

11. The process for the production of a hydrocarbon mixture suitable for use in the manufacture of motor fuel and consisting essentially of tri-isobutylene and tetra-isobutylene, which comprises introducing isobutylene into a liquid body comprising di-isobutylene and a catalytic amount of an equimolecular complex of boron trifluoride and diethyl ether dissolved in an inert reaction solvent while maintaining the temperature of said liquid body between about 15° C. and about 70° C., the molar ratio of isobutylene to di-isobutylene being between about 6 : 1 and about 1 : 1 and the isobutylene being introduced into said liquid body over a period of between about 0.25 and about 5.0 hours, and thereafter recovering from the resultant product a hydrocarbon mixture distilling between about 170° C. and about 245° C. under atmospheric pressure.

DONALD R. STEVENS.
ROBERT S. BOWMAN.

REFERENCES CITED

The following references are of record in the file of this patent:

UNITED STATES PATENTS

| Number | Name | Date |
|---|---|---|
| 2,216,253 | Schneider et al. | Oct. 1, 1940 |
| 2,396,753 | Rosen | Mar. 19, 1946 |
| 2,446,947 | Munday et al. | Aug. 10, 1948 |

FOREIGN PATENTS

| Number | Country | Date |
|---|---|---|
| 801,883 | France | Aug. 20, 1936 |
| 831,750 | France | Sept. 13, 1938 |

OTHER REFERENCES

Chem. Abstracts, vol. 41, No. 12, page 3946, (June 20, 1947), citing Topchiev et al., Neftyanoe Khoz. 24, No. 11, 45–50 (1946).